(12) United States Patent
Cho et al.

(10) Patent No.: US 8,994,217 B2
(45) Date of Patent: Mar. 31, 2015

(54) ENERGY STORAGE SYSTEM

(75) Inventors: Sungchun Cho, Yongin-si (KR);
Namsung Jung, Yongin-si (KR);
Jungpil Park, Yongin-si (KR); Sungsoo Hong, Yongin-si (KR); Chungwook Roh, Yongin-si (KR); Sangkyoo Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 934 days.

(21) Appl. No.: 13/118,305

(22) Filed: May 27, 2011

(65) Prior Publication Data

US 2011/0298288 A1 Dec. 8, 2011

(30) Foreign Application Priority Data

Jun. 7, 2010 (KR) .................... 10-2010-0053428

(51) Int. Cl.
*H02J 7/00* (2006.01)
*H01M 10/46* (2006.01)
*H02J 7/35* (2006.01)
*H02M 3/158* (2006.01)

(52) U.S. Cl.
CPC ............ *H01M 10/465* (2013.01); *H02J 7/35* (2013.01); *H02M 3/1582* (2013.01)
USPC ........................................................ 307/82

(58) Field of Classification Search
USPC ........................................................ 307/82
See application file for complete search history.

(56) References Cited

U.S. PATENT DOCUMENTS

| | | | |
|---|---|---|---|
| 2005/0173985 A1* | 8/2005 | Eguchi et al. | 307/10.1 |
| 2009/0027001 A1* | 1/2009 | Haines | 320/101 |
| 2009/0152947 A1* | 6/2009 | Wang | 307/24 |
| 2009/0236916 A1* | 9/2009 | Nishimura | 307/80 |

FOREIGN PATENT DOCUMENTS

| | | |
|---|---|---|
| EP | 1 143 594 A2 | 10/2001 |
| EP | 1 959 535 A2 | 8/2008 |

(Continued)

OTHER PUBLICATIONS

KIPO Office Action dated Jul. 1, 2011 for Korean priority patent application 10-2010-0053428, noting the listed references in this IDS, 4 pages.

(Continued)

*Primary Examiner* — Rexford Barnie
*Assistant Examiner* — Joseph Inge
(74) *Attorney, Agent, or Firm* — Christie, Parker & Hale, LLP

(57) ABSTRACT

An energy storage system includes a converter coupled between an inverter and both a power generator and a battery, thereby reducing the number of devices for circuit implementation and the size of a printed circuit board (PCB). The energy storage system is coupled to an electric power system that generates a system power, and the energy storage system includes a battery for generating a battery power and a converter coupleable to a power generator for generating an electric power and the battery in parallel, wherein the converter is configured to boost or drop a voltage of at least one of the electric power, the battery power, or the system power.

16 Claims, 5 Drawing Sheets

(56) References Cited

FOREIGN PATENT DOCUMENTS

| | | |
|---|---|---|
| EP | 2 362 517 A2 | 8/2011 |
| EP | 2 503 665 A1 | 9/2012 |
| JP | 06-078473 | 3/1994 |
| JP | 11-136879 | 5/1999 |
| JP | 11-346445 | 12/1999 |
| JP | 2002-354677 | 12/2002 |
| JP | 2003-153464 | 5/2003 |
| JP | 2004-180467 | 6/2004 |
| JP | 2008-054473 | 3/2008 |

OTHER PUBLICATIONS

Patent Abstract of Japan, and English Machine translation of Japan Publication 2004-180467 listed above, 9 pages.
European Search Report dated Sep. 2, 2011, for corresponding European Patent application 11166096.5, noting listed references in this IDS.
Patent Abstracts of Japan, and English machine translation of Japanese Publication 11-346445, listed above, 7 pages.
EPO Office action dated Sep. 11, 2013, for corresponding European Patent application 11166096.5, (5 pages).

* cited by examiner

ENERGY STORAGE SYSTEM

CROSS-REFERENCE TO RELATED APPLICATION

This application claims priority to and the benefit of Korean Patent Application No. 10-2010-0053428, filed on Jun. 7, 2010, the entire content of which is incorporated herein by reference.

BACKGROUND

1. Field

Aspects of embodiments of the present invention relate to an energy storage system.

2. Description of the Related Art

In an energy storage system, a solar battery and an electric power system are linked to each other to supply power to various kinds of loads, and surplus power is stored in a secondary battery.

In order to smoothly transfer power among the solar battery, the electric power system, the secondary battery and the load, the energy storage system includes a plurality of converters that convert a DC (direct current) power into another DC power of a desired level, and an inverter that inverts a DC power into an AC (alternating current) power, or an AC power into a DC power.

As described above, the existing energy storage system requires a number of converters and an inverter, thereby increasing the number of devices for circuit implementation and increasing the size of a printed circuit board (PCB).

SUMMARY

Aspects of embodiments according to the present invention are directed toward an energy storage system including a converter (e.g., a bidirectional converter) coupled to a power generator (e.g., a renewable energy unit) and a battery in parallel, thereby reducing the number of devices for circuit implementation and the size of a printed circuit board (PCB).

According to an embodiment of the present invention, an energy storage system includes a battery configured to store an electric power from a power generator and to supply a battery power, an inverter for transforming between direct current (DC) power and alternating current (AC) power, and a converter between the inverter and both the power generator and the battery. The converter is configured to form a same electrical path to the inverter from the power generator and the battery.

The energy storage system may further include a selecting switch unit including a first selecting switch coupled between the power generator and the converter, and a second selecting switch coupled between the battery and the converter; and an integrated controller for controlling the converter and the selecting switch unit.

When the electric power is detected, the integrated controller may be configured to turn the first selecting switch ON and control the converter to boost the electric power to be supplied to a load coupled to the inverter.

The integrated controller may be configured to control a surplus of the electric power remaining after being supplied to the load to be supplied to an electric power system coupled to the inverter when the electric power is greater than a load power consumed by the load.

The integrated controller may be configured to control a surplus of the electric power remaining after being supplied to the load to be supplied to the battery when the electric power is greater than a load power consumed by the load.

The integrated controller may be configured to control the electric power and a system power supplied from an electric power system to be supplied to the load when the electric power is smaller than a load power consumed by the load.

The integrated controller may be configured to turn the second selecting switch ON and control the converter to drop a voltage of a system power supplied from an electric power system to be supplied to the battery when the electric power is not detected.

The integrated controller may be configured to turn the first selecting switch and the second selecting switch ON and control the converter to boost a voltage of the electric power and a voltage of the battery power to be supplied to a load coupled to the inverter when a power failure of an electric power system is detected.

The integrated controller may be configured to control the converter to drop a voltage of a surplus of the electric power remaining after being supplied to a load coupled to the inverter to be supplied to the battery when the electric power is greater than a load power consumed by the load.

The energy storage system may further include a direct current (DC) link coupled between the converter and the inverter; and a system linker coupled between the inverter and an electric power system, wherein the integrated controller may be configured to control operations of the inverter and the system linker.

The converter may include a coil including a first terminal coupled to a first terminal of the power generator and a first terminal of the battery, and a second terminal coupled to a first terminal of the DC link; a first switch including a first terminal coupled to a second terminal of the power generator and a second terminal of the battery, and a second terminal coupled to a second terminal of the coil; and a second switch including a first terminal coupled to the second terminal of the coil and the second terminal of the first switch, and a second terminal coupled to the first terminal of the DC link.

The first switch may further include a parasitic diode including an anode coupled to the first terminal of the first switch, and a cathode coupled to the second terminal of the first switch.

The second switch may further include a parasitic diode including an anode coupled to the first terminal of the second switch, and a cathode coupled to the second terminal of the second switch.

The first selecting switch may be coupled between the first terminal of the power generator and the first terminal of the coil, and the second selecting switch may be coupled between the first terminal of the battery and the first terminal of the coil.

The integrated controller may include a maximum power point tracking controller configured to track a maximum power point of the power generator according to changes of solar radiation and temperature.

The energy storage system may further include the power generator configured to generate the electric power from sunlight, solar heat, wind power, tidal energy, geothermal heat, or combinations thereof.

According to an embodiment of the present invention, an energy storage system is coupled to an electric power system for generating a system power, and the energy storage system includes a battery for providing a battery power and a converter coupled to a power generator and the battery in parallel, the power generator for generating an electric power. The converter is configured to boost or drop a voltage of at least one of the electric power, the battery power, or the system power.

According to an embodiment of the present invention, an energy storage system includes a battery coupleable to a power generator for generating an electric power, the battery being configured to store the electric power; an inverter for transforming between direct current (DC) and alternating current (AC) power; and a converter having a first terminal coupled to the inverter and a second terminal coupleable to at least one of the power generator or the battery, the converter being configured to boost or drop a voltage at one of the first terminal or the second terminal to output to the other one of the first terminal or the second terminal.

An energy storage system according to embodiments of the present invention includes a converter (e.g., a bidirectional converter) coupled to a power generator (e.g., a renewable energy unit) and a battery in parallel, thereby reducing the number of devices for circuit implementation and the size of a printed circuit board (PCB). Therefore, the energy storage system according to embodiments of the present invention can substantially reduce the overall energy storage system manufacturing cost.

Additional aspects and/or features of embodiments according to the present invention will be set forth in part in the description which follows and, in part, will be obvious from the description, or may be learned by practice of the invention.

BRIEF DESCRIPTION OF THE DRAWINGS

The features and aspects of embodiments according to the present invention will be more apparent from the following detailed description in conjunction with the accompanying drawings, in which.

DETAILED DESCRIPTION

Figure 1:
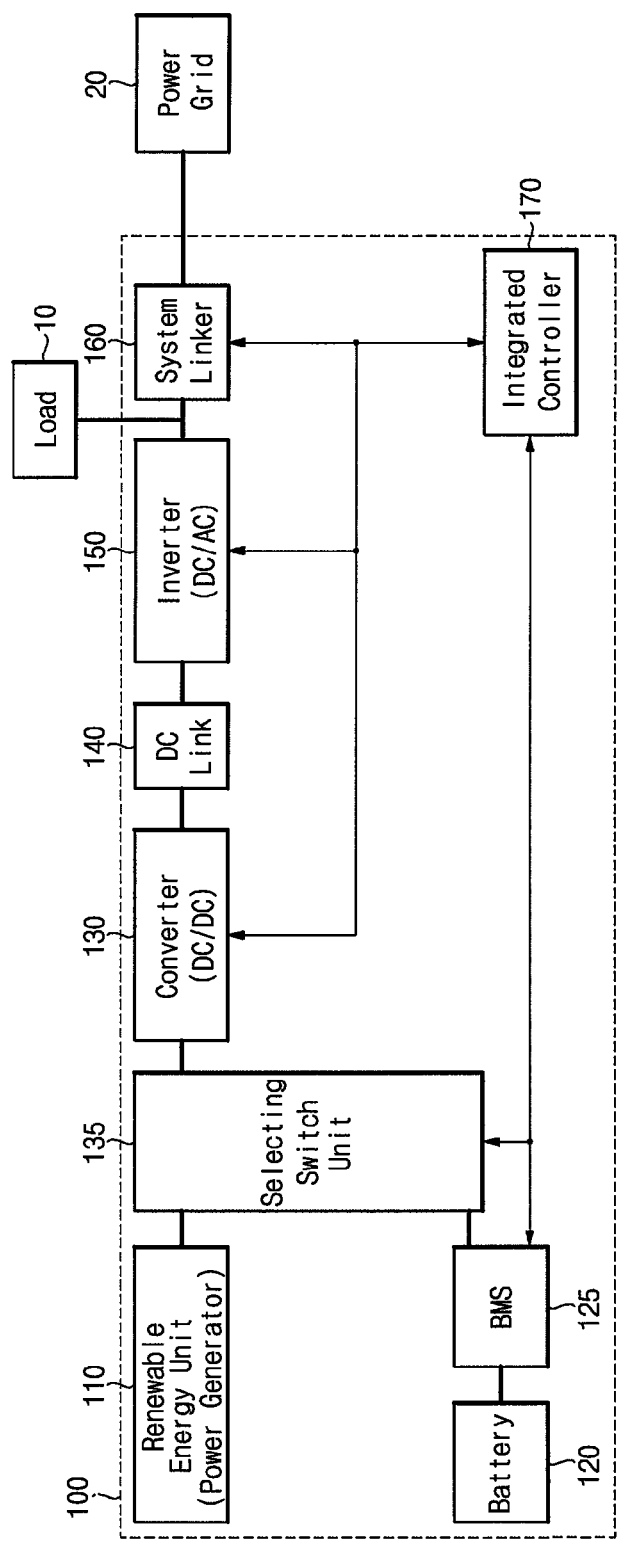
FIG. 1 illustrates a configuration of an energy storage system according to an embodiment of the present invention.

Hereinafter, embodiments of the present invention will be described in detail with reference to the accompanying drawings.

Throughout the specification, like reference numerals refer to like elements. It will be understood that when an element is referred to as being "connected to" or "coupled to" another element, it may be directly connected to the other element, or one or more intervening elements may also be present therebetween.

Figure 2:
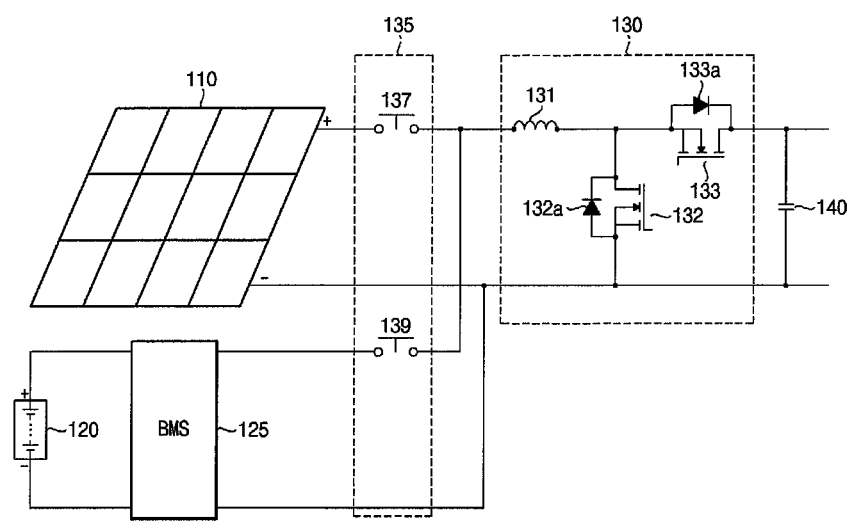
FIG. 2 is a circuit diagram illustrating a power generator (e.g., a renewable energy unit), a battery, a converter (e.g., a bidirectional converter), a selecting switch unit, and a DC link illustrated in FIG. 1.

FIG. 1 illustrates a configuration of an energy storage system 100 according to an embodiment of the present invention, and FIG. 2 is a circuit diagram illustrating a power generator (e.g., a renewable energy unit), a battery, a converter (e.g., a bidirectional converter), a selecting switch unit, and a DC link illustrated in FIG. 1.

Referring to FIGS. 1 and 2, the energy storage system (ESS) 100 according to an embodiment of the present invention includes a power generator (e.g., a renewable energy unit) 110, a battery 120, a battery management system (BMS) 125, at least one converter (e.g., a bidirectional converter) 130, a selecting switch unit 135, a direct current (DC) link 140, an inverter (e.g., a bidirectional inverter) 150, a system linker 160, and an integrated controller 170. In FIG. 1, the energy storage system 100 is shown as being coupled to a load 10 and an electric power system (e.g., a power grid) 20. While the power generator 110 is shown as included in the energy storage system 100, in practice, the power generator 110 may not be an integral part of the energy storage system 100. Further, while the power generator 110 will be described primarily as a renewable energy unit, any suitable types of power generator can constitute the power generator 110.

The power generator 110 may be a renewable energy unit that includes a solar battery (e.g., a solar cell), a wind power plant, a tidal plant, a geothermal power plant, or any combination thereof. The power generator 110 generates an electrical energy produced from natural energy sources such as solar heat, sunlight (e.g., solar light), wind power, tidal energy, and geothermal heat (e.g., heat from the earth), such that the power generator 110 supplies the electrical energy produced from renewable energy sources. Here, the electrical energy may be DC power. In some embodiments of the present invention, the power generator 110 is described with regard to a solar cell as an example. As shown in FIG. 2, the power generator 110 includes a first terminal (+) and a second terminal (−).

The battery 120 provides a battery power. The battery 120 may be a secondary battery that can be charged and discharged, and may include a plurality of battery cells of a small capacity or one battery cell of a large capacity to provide a large power. Here, the battery power may be a DC power.

The BMS 125 is coupled to both terminals, which include a first terminal (+) and a second terminal (−), of the battery 120, and the BMS 125 maintains and manages a state of the battery 120. In more detail, the BMS 125 monitors voltage, current, and temperature of the battery 120 to ensure the battery's safety and checks a State Of Charge (SOC), a State Of Health (SOH), battery cell balancing, and a cooling state of the battery in order to control charge and discharge of the battery 120.

The converter 130 is coupled to the power generator 110 and the battery 120 in parallel, and is also coupled to the DC link 140. The converter 130 converts a renewable energy power extracted at maximum power point of the power generator 110 tracked by the integrated controller 170 into a DC power of a desired level and supplies the converted DC power to the DC link 140. Additionally, the converter 130 converts a battery power of the battery 120 into a DC power of a desired level and supplies the converted DC power to the DC link 140. Further, the converter 130 converts a power stored in the DC link 140, for example, a converted renewable energy power or an inverted system power into a DC power of a desired level and then supplies the same to the battery 120. To this end, as shown in FIG. 2, the converter 130 includes a coil 131, a first switch 132, and a second switch 133, according to an embodiment of the present invention.

The coil 131 includes a first terminal coupled to the first terminal (+) of the power generator 110 and the first terminal (+) of the battery 120, and a second terminal coupled to the first terminal of the DC link 140.

The first switch 132 includes a first terminal coupled to the second terminal (−) of the power generator 110 and the second terminal (−) of the battery 120, and a second terminal coupled to the second terminal of the coil 131. In addition, the first switch 132 may include a parasitic diode 132*a* having an anode coupled to the first terminal of the first switch 132, and a cathode coupled to the second terminal of the first switch 132. While FIG. 2 illustrates a Metal Oxide Semiconductor Field Effect Transistor (MOSFET) switch as the first switch 132, any suitable switching device may be used as the first switch 132 as long as it may function as a switch. Here, the first terminal of the first switch 132 may be a source terminal, and the second terminal of the first switch 132 may be a drain terminal.

The second switch 133 includes a first terminal coupled to the second terminal of the coil 131 and the second terminal of the first switch 132, and a second terminal coupled to the first terminal of the DC link 140. In addition, the second switch 133 may include a parasitic diode 133*a* having an anode coupled to the first terminal of the second switch 133, and a cathode coupled to the second terminal of the second switch 133. While FIG. 2 illustrates a MOSFET switch as the second switch 133, any suitable switching device may be used as the second switch 133 as long as it may function as a switch. Here, the first terminal of the second switch 133 may be a source terminal, and the second terminal of the second switch 133 may be a drain terminal.

The converter 130 having the aforementioned configuration may function as a boost converter that boosts a voltage of a first input power or a buck converter that drops a voltage of a second input power. Here, the first input power may be the input power from the power generator 110, and the second input power may be the input power from the DC link 140. Accordingly, the converter 130 is coupled between the inverter 150 and both the power generator 110 and the battery 120. As such, the converter 130 may form a same electrical path to the inverter 150 from the power generator 110 and the battery 120.

The selecting switch unit 135 is coupled to the power generator 110, the battery 120 and the converter 130. The selecting switch unit 135 allows a renewable energy power and/or a battery power to be supplied to the converter 130. In addition, the selecting switch unit 135 allows a power stored in the DC link 140 to be supplied to the battery 120 through the converter 130. To this end, the selecting switch unit 135 may include a first selecting switch 137 and a second selecting switch 139, according to an embodiment of the present invention.

The first selecting switch 137 is coupled between the power generator 110 and the converter 130, for example, between the first terminal (+) of the power generator 110 and the first terminal of the coil 131. While FIG. 2 illustrates a relay switch as the first selecting switch 137, any suitable switching device may be used as the first selecting switch 137 as long as it may function as a switch. When the first selecting switch 137 is ON, the renewable energy power of the power generator 110 may be supplied to the converter 130.

The second selecting switch 139 is coupled between the battery 120 and the converter 130, for example, between the first terminal (+) of the battery 120 and the first terminal of the coil 131. While FIG. 2 illustrates a relay switch as the second selecting switch 139, any suitable switching device may be used as the second selecting switch 139 as long as it may function as a switch. When the second selecting switch 139 is ON, the power stored in the DC link 140 may be supplied to the battery 120 through the converter 130. In addition, when the second selecting switch 139 is ON, the battery power of the battery 120 is supplied to the converter 130. Here, the converter 130 has a first terminal coupled to the inverter 150 through the DC Link 140, and a second terminal selectively coupleable to at least one of the power generator 110 or the battery 120 through the selecting switch unit 135.

The DC link 140 is coupled between the converter 130 and the inverter 150. The DC link 140 stores the renewable energy power supplied from the converter 130 or the battery power supplied from the battery 120. In addition, the DC link 140 stores the system power supplied from the inverter 150. The DC link 140 may be implemented in the form of a capacitor or other suitable devices. Here, the system power stored in the DC link 140 is a DC power.

The inverter 150 is coupled to the DC link 140 and inverts the DC power stored in the DC link 140 into an AC power. In addition, the inverter 150 is coupled to the electric power system 20 and inverts the system power supplied from the electric power system 20 into a DC power.

The load 10 is coupled to a connection point between the inverter 150 and the electric power system 20. The load 10 may receive an AC power from the inverter 150 that inverts a DC power stored in the DC link 140. In addition, the load 10 may receive an AC power from the electric power system 20. The load 10 may be a home or an industrial facility that consumes the AC power.

The electric power system 20 may serve as an electrical link over a broad area including, for example, a power plant, a transformer substation, and a power-transmission line for providing a system power. Here, the system power may be an AC power. The electric power system 20 is coupled to the inverter 150 and the load 10, and receives the AC power from the inverter 150 that inverts the DC power stored in the DC link 140, or supplies the system power to the load 10.

The system linker 160 is coupled to the inverter 150, the load 10, and the electric power system 20, and controls a connection or disconnection of the electric power system 20. For example, when a problem, such as a power failure, occurs to the electric power system 20, the system linker 160 allows the electric power system 20 to be disconnected from the inverter 150 and the load 10, thereby enabling a worker to solve the problem of the electric power system 20 in safe surroundings. Once the problem of the electric power system 20 is solved, the system linker 160 allows the electric power system 20 to be reconnected to the inverter 150 and the load 10.

The integrated controller 170 monitors and controls the BMS 125, the converter 130, the selecting switch unit 135, the inverter 150, and the system linker 160. Accordingly, the integrated controller 170 controls the generation of the renewable energy power, the battery power, and the system power. In one embodiment, the integrated controller 170 includes a maximum power point tracking controller that operates according to an algorithm to track the maximum power point of the power generator 110 according to changes of solar radiation and temperature.

Next, operations of the aforementioned energy storage system 100 for generating and/or storing the generated power (e.g., the renewable energy power), the system power and the battery power will be described in more detail.

In the following, the power generated from the power generator 110 is referred to as a renewable energy power $P_S$, the power provided by the battery 120 is referred to as a battery power $P_B$, the power generated from the electric power system 20 is referred to as a system power $P_G$, and the power required or consumed by the load 10 is referred to as a load power $P_L$.

Figure 3:
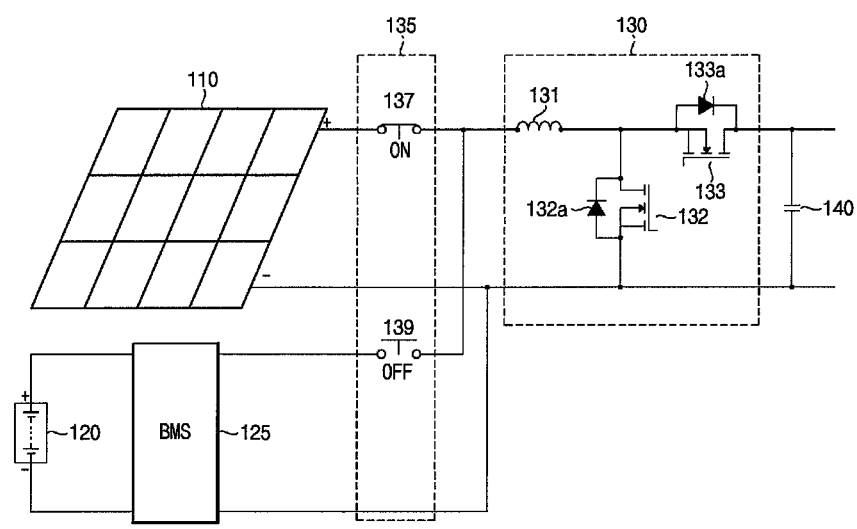
FIG. 3 illustrates the operation of the selecting switch unit for supplying a renewable energy power to a load illustrated in FIG. 1.

FIG. 3 is a circuit diagram illustrating the operation of the selecting switch unit 135 for supplying the renewable energy power to the load 10 coupled to the energy storage system 100 illustrated in FIG. 1.

Referring to FIGS. 1 and 3, first, the integrated controller 170 detects the renewable energy power $P_S$. Here, when the renewable energy power $P_S$ is generated from solar energy, the renewable energy power $P_S$ cannot be detected at nighttime when the solar heat or the sunlight is not available, but can be detected at daytime when the solar heat or the sunlight is available. When it is determined that the detected renewable energy power $P_S$ is greater than the load power $P_L$, the integrated controller 170 turns the first selecting switch 137 ON and the second selecting switch 139 OFF. Then, the converter 130 converts the renewable energy power $P_S$ into a DC power of a desired level to be supplied to the DC link 140, and the inverter 150 inverts the renewable energy power $P_S$ supplied from the DC link 140 into an AC power, which is supplied to the load 10. Here, the converter 130 may boost a voltage of the renewable energy power $P_S$. When there is a surplus of the renewable energy power $P_S$ in excess of the amount supplied to the load 10, the integrated controller 170 supplies the surplus of the renewable energy power $P_S$ to the electric power system 20. Here, the integrated controller 170 turns the first selecting switch 137 ON to detect the renewable energy power $P_S$ and identifies a load power $P_L$ through the system linker 160. In other cases, when the switch 139 is turned on and the switch 137 is turned off, the surplus of the renewable energy power $P_S$ may be supplied to the battery 120.

In addition, when it is determined that the detected renewable energy power $P_S$ is smaller than the load power $P_L$, the integrated controller 170 also turns the first selecting switch 137 ON and the second selecting switch 139 OFF. Then, the converter 130 converts the renewable energy power $P_S$ into a DC power of a desired level to be supplied to the DC link 140, and the inverter 150 inverts the renewable energy power $P_S$ supplied from the DC link 140 into an AC power to be supplied to the load 10. Likewise, the converter 130 may boost a voltage of the renewable energy power $P_S$. However, the renewable energy power $P_S$ supplied to the load 10 is not enough to satisfy the load power $P_L$. Accordingly, some of the load power $P_L$ may be covered from the system power $P_G$ supplied from the electric power system 20.

Figure 4:
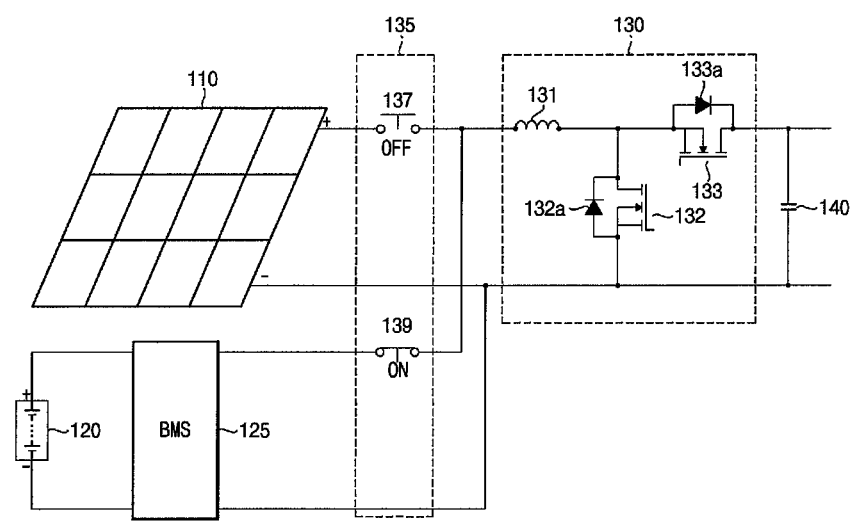
FIG. 4 illustrates the operation of the selecting switch unit for supplying a system power to the battery in the energy storage system illustrated in FIG. 1.

FIG. 4 is a circuit diagram illustrating the operation of the selecting switch unit 135 for supplying a system power to the battery 120 in the energy storage system 100 illustrated in FIG. 1.

Referring to FIGS. 1 and 4, when there is no renewable energy power $P_S$ detected (for example, at nighttime without solar heat or sunlight), the integrated controller 170 turns the first selecting switch 137 OFF and turns the second selecting switch 139 ON. Then, the converter 130 converts the system power $P_G$ stored in the DC link 140 into a DC power of a desired level to be supplied to the battery 120. Here, the converter 130 may drop a voltage of the system power $P_G$ to a voltage suitable to be supplied to the battery 120.

Figure 5:
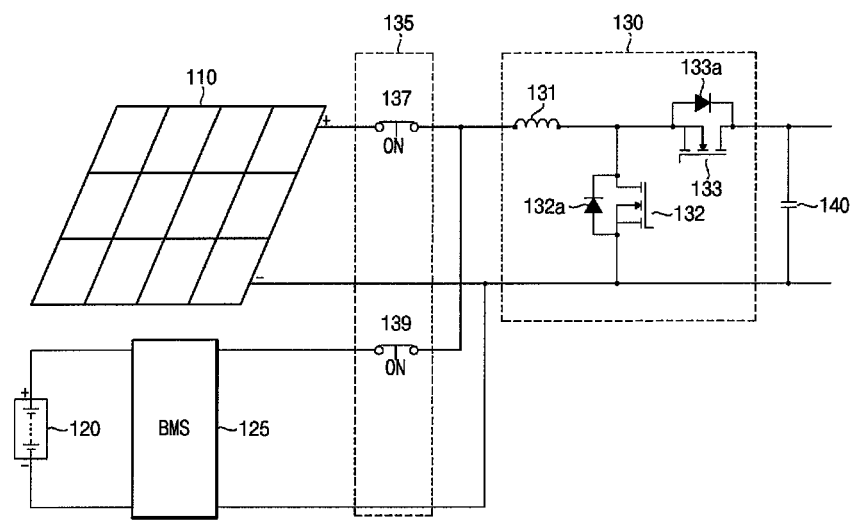
FIG. 5 is a circuit diagram illustrating the operation of the selecting switch unit for supplying a generated power (e.g., a renewable energy power) and the system power to the load illustrated in FIG. 1.

FIG. 5 is a circuit diagram illustrating the operation of the selecting switch unit 135 for supplying a renewable energy power and a system power to the load 10 in the energy storage system 100 illustrated in FIG. 1.

Referring to FIG. 5, when a power failure of the system linker 160 is detected, the integrated controller 170 turns the first selecting switch 137 ON and turns the second selecting switch 139 ON. Then, the converter 130 converts the renewable energy power $P_S$ and the battery power $P_B$ into a DC power of desired level to be supplied to the DC link 140, and the inverter 150 inverts the power supplied from the DC link 140 into an AC power to be supplied to the load 10. Here, the converter 130 may boost voltages of the renewable energy power $P_S$ and the battery power $P_B$. If the renewable energy power $P_S$ is greater than the load power $P_L$, only the renewable energy power $P_S$ is supplied to the load 10. Then, a surplus of the renewable energy power $P_S$ remaining in the DC link 140 in excess of the amount supplied to the load 10 is converted by the converter 130, and then supplied to the battery 120. Here, the first selecting switch 137 is turned OFF and only the second selecting switch 139 is turned ON. The converter 130 may perform a voltage-drop operation.

In the event that a power failure occurs to the electric power system 20, quantities of the renewable energy power $P_S$ of the power generator 110 and the battery power $P_B$ of the battery 120 supplied to the load 10 will now be described in more detail. In one embodiment, the renewable energy power $P_S$ is generated from a solar cell, a voltage of the battery 120 is 200 V, and the load power $P_L$ is 400 W.

Figure 6:
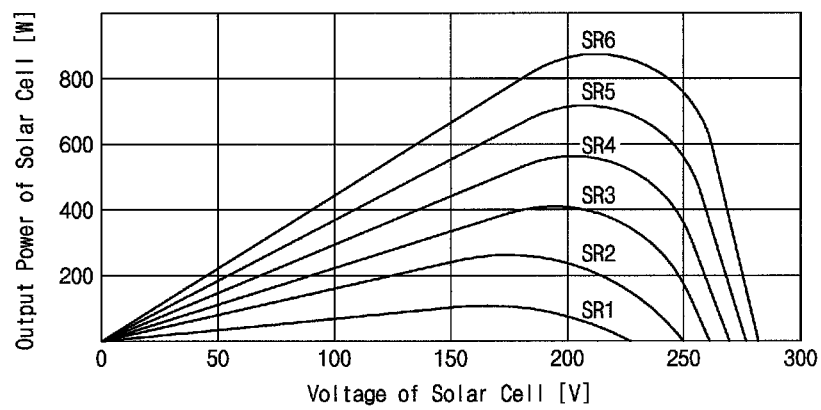
FIG. 6 is a graph illustrating power levels measured depending on the voltage of a solar cell.

FIG. 6 is a graph illustrating power levels measured depending on the voltage of a solar cell, where the x axis (i.e., the abscissa) represents voltages of the solar cell, and the y axis (i.e., the ordinate) represents output power levels of the solar cell. Additionally, curves SR1 to SR6 represent maximum power points of the solar cell output depending on the solar radiation.

Specifically, the SR1 shows that the solar cell has a voltage of 170 V and an output power of approximately 109 W at the maximum power point before a power failure occurs to the electric power system 20. This is a case that the voltage of the solar cell at the maximum power point is smaller than that of the battery 120 (e.g., 200 V). In this case, if a power failure occurs to the electric power system 20, as shown in FIG. 5, the first selecting switch 137 and the second selecting switch 139 are turned ON, so that the power generator 110 and the battery 120 are coupled to each other. Then, the voltage of the solar cell at the maximum power point increases to 200 V, which is equal to the voltage of the battery 120. In this case, the output power of the solar cell decreases to 88 W. Accordingly, the renewable energy power $P_S$ supplied from the solar cell to the load 10 is 88 W, and the battery power $P_B$ supplied from the battery 120 to the load 10 is 312 W, that is, 400-88 W.

The SR5 shows that the solar cell has a voltage of 215V and an output power of about 697 W at the maximum power point before a power failure occurs to the electric power system 20. This is a case that the voltage of the solar cell at the maximum power point is greater than that of the battery 120. In this case, if a power failure occurs to the electric power system 20, as shown in FIG. 5, the first selecting switch 137 and the second selecting switch 139 are turned ON, so that the power generator 110 and the battery 120 are coupled to each other. Then, the voltage of the solar cell at the maximum power point decreases to 200 V. In this case, the output power of the solar cell decreases to 687 W. Accordingly, the amount of the renewable energy power $P_S$ supplied from the solar cell to the load 10 is 400 W, and a surplus of the renewable energy power $P_S$ supplied to the battery 120 is 287 W, that is, 687-400 W.

As described above, since the energy storage system 100 according to an embodiment of the present invention includes the converter 130 coupled to the power generator 110 and the battery 120 in parallel, the number of devices for circuit implementation can be reduced, and the size of a printed circuit board (PCB) can be reduced, as compared to the conventional bidirectional converter. Therefore, the energy storage system according to embodiments of the present invention can substantially reduce the overall energy storage system manufacturing cost.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims and their equivalents.

What is claimed is:

1. An energy storage system comprising:
a battery configured to store an electric power generated by a power generator and to supply a battery power;
an inverter for transforming between direct current (DC) power and alternating current (AC) power;
a converter between the inverter and both the power generator and the battery, the converter being configured to form a same electrical path to the inverter from the power generator and the battery;
a selecting switch unit comprising:
a first selecting switch coupled between the power generator and the converter, the first selecting switch being configured to selectively couple and decouple the converter to the power generator; and
a second selecting switch coupled between the battery and the converter, the second selecting switch being configured to selectively couple and decouple the converter to the battery;
an integrated controller for controlling the converter and the selecting switch unit;
a direct current (DC) link coupled between the converter and the inverter; and
a system linker coupled between the inverter and an electric power system,
wherein the integrated controller is configured to control operations of the inverter and the system linker.

2. The energy storage system of claim 1, wherein when the electric power is detected, the integrated controller is configured to turn the first selecting switch ON and control the converter to boost the electric power to be supplied to a load coupled to the inverter.

3. The energy storage system of claim 2, wherein the integrated controller is configured to control a surplus of the electric power remaining after being supplied to the load to be supplied to an electric power system coupled to the inverter when the electric power is greater than a load power consumed by the load.

4. The energy storage system of claim 2, wherein the integrated controller is configured to control a surplus of the electric power remaining after being supplied to the load to be supplied to the battery when the electric power is greater than a load power consumed by the load.

5. The energy storage system of claim 2, wherein the integrated controller is configured to control the electric power and a system power supplied from an electric power system to be supplied to the load when the electric power is smaller than a load power consumed by the load.

6. The energy storage system of claim 1, wherein the integrated controller is configured to turn the second selecting switch ON and control the converter to drop a voltage of a system power supplied from an electric power system to be supplied to the battery when the electric power is not detected.

7. The energy storage system of claim 1, wherein the integrated controller is configured to turn the first selecting switch and the second selecting switch ON and control the converter to boost a voltage of the electric power and a voltage of the battery power to be supplied to a load coupled to the inverter when a power failure of an electric power system is detected.

8. The energy storage system of claim 7, wherein the integrated controller is configured to control the converter to drop a voltage of a surplus of the electric power remaining after being supplied to a load coupled to the inverter to be supplied to the battery when the electric power is greater than a load power consumed by the load.

9. The energy storage system of claim 1, wherein the converter comprises:
a coil comprising a first terminal coupled to a first terminal of the power generator and a first terminal of the battery, and a second terminal coupled to a first terminal of the DC link;
a first switch comprising a first terminal coupled to a second terminal of the power generator and a second terminal of the battery, and a second terminal coupled to a second terminal of the coil; and
a second switch comprising a first terminal coupled to the second terminal of the coil and the second terminal of the first switch, and a second terminal coupled to the first terminal of the DC link.

10. The energy storage system of claim 9, wherein the first switch further comprises a parasitic diode including an anode coupled to the first terminal of the first switch, and a cathode coupled to the second terminal of the first switch.

11. The energy storage system of claim 9, wherein the second switch further comprises a parasitic diode including an anode coupled to the first terminal of the second switch, and a cathode coupled to the second terminal of the second switch.

12. The energy storage system of claim 9, wherein the first selecting switch is coupled between the first terminal of the power generator and the first terminal of the coil, and the second selecting switch is coupled between the first terminal of the battery and the first terminal of the coil.

13. The energy storage system of claim 1, wherein the integrated controller comprises a maximum power point tracking controller configured to track a maximum power point of the power generator according to changes of solar radiation and temperature.

14. The energy storage system of claim 1, wherein the energy storage system further comprises the power generator configured to generate the electric power from sunlight, solar heat, wind power, tidal energy, geothermal heat, or combinations thereof.

15. An energy storage system to be coupled to an electric power system for generating a system power, the energy storage system comprising:
a battery for providing a battery power;
an inverter for transforming between direct current (DC) power and alternating current (AC) power;
a converter coupled to a power generator and the battery in parallel, the power generator for generating an electric power;
a selecting switch unit comprising:
a first selecting switch coupled between the power generator and the converter, the first selecting switch being configured to selectively couple and decouple the converter to the power generator; and
a second selecting switch coupled between the battery and the converter, the second selecting switch being configured to selectively couple and decouple the converter to the battery;
an integrated controller for controlling the converter and the selecting switch unit;

a direct current (DC) link coupled between the converter and the inverter; and a system linker coupled between the inverter and an electric power system, wherein the integrated controller is configured to control operations of the inverter and the system linker, and wherein the converter is configured to boost or drop a voltage of at least one of the electric power, the battery power, or the system power.

16. An energy storage system comprising:

a battery coupleable to a power generator for generating an electric power, the battery being configured to store the electric power;

an inverter for transforming between direct current (DC) power and alternating current (AC) power;

a converter having a first terminal coupled to the inverter and a second terminal coupleable to at least one of the power generator or the battery, the converter being configured to boost or drop a voltage at one of the first terminal or the second terminal to output to the other one of the first terminal or the second terminal; and a selecting switch unit comprising:
   a first selecting switch coupled between the power generator and the converter, the first selecting switch being configured to selectively couple and decouple the converter to the power generator; and
   a second selecting switch coupled between the battery and the converter, the second selecting switch being configured to selectively couple and decouple the converter to the battery;

an integrated controller for controlling the converter and the selecting switch unit;

a direct current (DC) link coupled between the converter and the inverter; and a system linker coupled between the inverter and an electric power system, wherein the integrated controller is configured to control operations of the inverter and the system linker.

\* \* \* \* \*